United States Patent

[11] 3,622,872

[72] Inventor Virgil L. Boaz
 Daleville, Ind.
[21] Appl. No. 29,165
[22] Filed Apr. 16, 1970
[45] Patented Nov. 23, 1971
[73] Assignee Westinghouse Electric Corporation
 Pittsburgh, Pa.

[54] METHODS AND APPARATUS FOR DETECTING AND LOCATING CORONA DISCHARGE IN HIGH-VOLTAGE, FLUID-FILLED ELECTRICAL INDUCTIVE APPARATUS
12 Claims, 4 Drawing Figs.

[52] U.S. Cl. ................................................. 324/52, 324/54
[51] Int. Cl. ............................................. G01r 31/06, G01r 31/08, G01r 31/12
[50] Field of Search ........................................... 324/52, 54, 72; 340/16

[56] References Cited
UNITED STATES PATENTS
| | | | |
|---|---|---|---|
| 3,173,086 | 3/1965 | Kresge ........................ | 324/52 |
| 3,278,892 | 10/1966 | Kirsten et al. ................. | 340/16 UX |
| 3,505,597 | 4/1970 | Cronin et al. ................. | 324/72 |
| 3,430,136 | 2/1969 | Brustle et al. ................. | 324/52 |
| 3,504,334 | 3/1970 | Turnage ....................... | 340/16 |

Primary Examiner—Gerard R. Strecker
Attorneys—A. T. Stratton, F. E. Browder and Donald R. Lackey ABSTRACT: Methods and apparatus for detecting and locating the source of a corona discharge within the casing of fluid-filled electrical apparatus. In one embodiment of the invention, the corona is detected and located by transducers connected to generate circles of increasing radii on the screen of a cathode-ray oscilloscope. In another embodiment of the invention, the corona is detected and located by generating signals having magnitudes responsive to the X, Y, and Z coordinates of the corona source.

METHODS AND APPARATUS FOR DETECTING AND LOCATING CORONA DISCHARGE IN HIGH-VOLTAGE, FLUID-FILLED ELECTRICAL INDUCTIVE APPARATUS

BACKGROUND OF THE INVENTION

1. Field of the Invention

The invention relates in general to electrical inductive apparatus, such as transformers, and more specifically to new and improved methods and apparatus for detecting and locating the source of corona discharges within such apparatus.

2. Description of the Prior Art

Testing high-voltage, fluid-filled electrical inductive apparatus for corona is desirable, as it may locate weak points or faults in the insulation system of the apparatus, which may cause partial breakdown of the insulation system with an accompanying energy dissipation which ionizes the surrounding insulation. Corona testing may thus locate incipient faults not detected by conventional test methods, but which may cause complete breakdown of the insulation in the future.

The corona test must not only indicate the presence of corona in the apparatus, but it should provide some means for locating the source of the discharge within the apparatus. There are many different arrangements in the prior art for detecting and locating the source of corona, such as the arrangements disclosed in the copending application Ser. Nos. 690,298, now U.S. Pat. No. 3,505,597, and 862,431, filed Dec. 13, 1967 and Sept. 30, 1069 respectively, which applications are assigned to the same assignee as the present application. While these and other prior art arrangements provide good results, it would be desirable to provide new and improved methods of detecting and locating corona which allow a more rapid determination to be made of the location of the corona source, and which will provide results which may be interpreted by production or test personnel having little or no technical training.

SUMMARY OF THE INVENTION

Briefly, one embodiment of the invention discloses new and improved methods and apparatus for corona detection and location, in which a transparent overlaying having the outline configuration thereon of the apparatus being tested is placed on the screen of a cathode-ray oscilloscope. Circles of increasing radii are generated on the screen of the cathode-ray oscilloscope, in response to transducers disposed in vibration responsive association with the electrical apparatus, with the centers of the circles being positioned on the overlay to correspond to the position of the transducers relative to the electrical apparatus. The circles are initiated substantially simultaneously with the corona discharge, with each circle increasing its radius at a predetermined rate until its associated transducer detects the corona discharge through pressure wave initiated vibrations in the apparatus, and initiates signal which holds the radius of the circle at the magnitude which existed at the time it detected the corona. Thus, the final radius of each circle corresponds to the distance traveled by pressure waves from the corona source to its associated transducer, and the approximate location of the corona source may be quickly determined by observing the intersections of the circles.

In another embodiment of the invention, the corona source is quickly and accurately determined by methods and apparatus which provide three signals having magnitudes corresponding to the X, Y and Z Cartesian coordinates of the corona source. Four transducers are disposed in vibration responsive association with the apparatus being tested, such that a line drawn, from a predetermined transducer to any of the others, is perpendicular to the lines drawn from this same predetermined transducer to the remaining transducers.

BRIEF DESCRIPTION OF THE DRAWINGS

The invention may be more readily understood when considered in view of the following detailed description of exemplary embodiments thereof, taken with the accompanying drawings, in which.

DESCRIPTION OF TEE PREFERRED EMBODIMENTS

In a first embodiment of the invention, a corona discharge within the tank of casing of electrical inductive apparatus is detected and located by a new and improved method which includes the steps of providing a cathode-ray oscilloscope, providing a view of the transformer as an overlay for the screen of the cathode-ray oscilloscope, providing mechanical to electrical transducers which are disposed on a plane parallel with the side of the apparatus shown in the view, in mechanical vibration responsive association with the electrical inductive apparatus, and producing circles on the screen of the cathode-ray oscilloscope whose centers are located on the overlay to correspond to the actual positions of the transducers relative to the view of the electrical inductive apparatus, with the radii of the circles corresponding to the distance traveled by pressure waves from the corona source to the various transducers. The area common to two intersecting circles on the screen of the cathode-ray oscilloscope establishes the location of the corona, when observing the view of the transformer represented by the overlay. Then, by repeating the test using transducers placed on a second plane, perpendicular to the plane used in the first test, and using an overlay corresponding to this second plane, the source of corona may be located within the apparatus. While the method may be carried out with a single cathode ray oscilloscope having a single beam by using an electronic switch, and two separate test setups, one for each overlay view of the transformer, it would be preferable to utilize two oscilloscopes each having a dual beam or two cathodes, since all of the required test data could then be obtained with one corona discharge. Since this latter arrangement is the preferred embodiment, only apparatus for performing this embodiment will be described, as it will be obvious from the description of this embodiment how to perform the method using less apparatus and more test setups.

Figure 1:
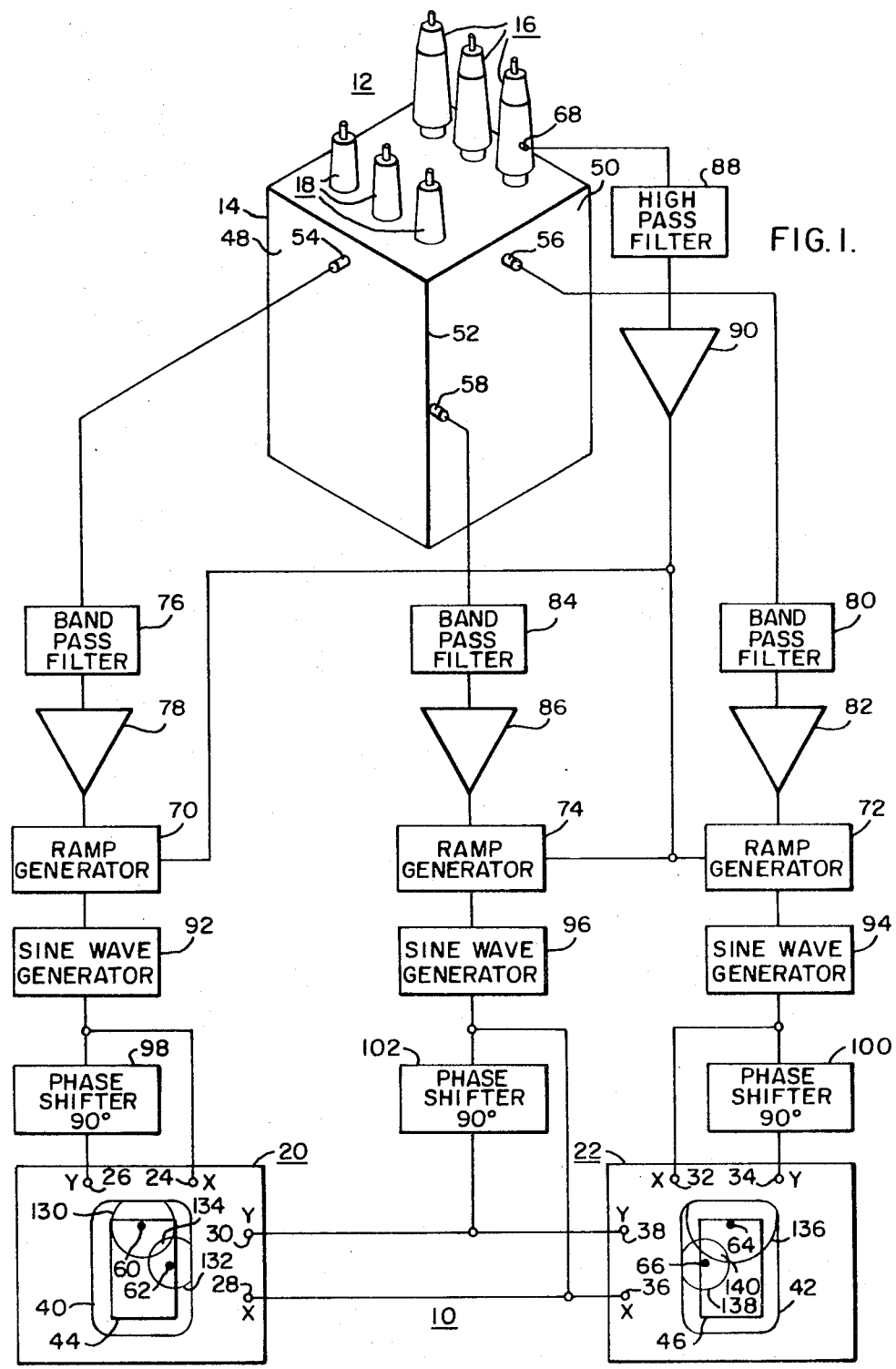
FIG. 1 is a block diagram of corona testing apparatus constructed according to an embodiment of the invention.

Referring now to the drawings, and FIG 1 in particular, there is shown corona test apparatus 10 constructed according to a first embodiment of the invention, for testing high-voltage inductive apparatus, such as transformer 12. Transformer 12 may be any suitable type, having a tank or casing 14, high- and low-voltage bushing assemblies 16 and 18, respectively, and electrical windings (not shown) disposed within casing 14 and immersed in a fluid insulating and/or cooling dielectric, such as transformer oil.

Mechanical to electrical transducers are disposed in mechanical vibration responsive association with transformer 12, such as on two perpendicular planes within the tank, or, as shown in FIG. 1, against the outer surfaces of adjacent vertical sidewall portions 48 and 50 of transformer 12. Since it is more convenient to dispose the transducers against the outside wall portions of the transformer tank, the invention will be described using this arrangement. In general, two transducers are required per sidewall, but as illustrated in FIG. 1, only three transducers will be required if the signal of one transducer is used as a common channel.

More specifically, a transducer 54 is disposed against sidewall portion 48, a transducer 56 is disposed against sidewall portion 50, and a transducer 58 is disposed on any sidewall portion, such as adjacent the vertical corner 52, on either side thereof. When corona discharges are produced in the windings of transformer 12, either when the windings are energized with their rated potential, or when the windings are surge tested, the energy dissipated in the corona discharge causes high frequency pressure waves in the fluid of the transformer. The mechanical vibrations produced by these pressure waves are picked up by the transducers and the transducers in turn produce electrical signals.

The corona test apparatus 10, in this embodiment, includes first and second cathode-ray oscilloscopes 20 and 22, respectively, each having two beams or cathodes. The first beam of cathode-ray oscilloscope 20 has horizontal and vertical deflection terminals 24 and 26, respectively, and the second beam of cathode-ray oscilloscope 20 has horizontal and vertical deflection terminals 28 and 30, respectively. In like manner, the first beam of cathode-ray oscilloscope 22 has horizontal and vertical deflection terminals 32 and 34, respectively and the second beam of cathode-ray oscilloscope 22 has horizontal and vertical deflection terminals 36 and 38, respectively.

Cathode-ray oscilloscopes 20 and 22 have viewing screens 40 and 42, respectively, each having a transparent overlay disposed thereon which includes the outline configurations 44 and 46, respectively, corresponding to the sidewall portions 48 and 50 of transformer 12.

Each beam of each cathode-ray oscilloscope provides a circle whose radius is responsive to the distance of a specific transducer from the source of the corona discharge, with the first beams of cathode-ray oscilloscopes 20 and 22 being responsive to transducers 54 and 56, respectively, and with the second beams of both cathode-ray oscilloscopes being responsive to transducer 58. The controls of the cathode-ray oscilloscopes, for each of their beams, are set to locate centers of the circles on the overlay views of the transformer to correspond to the location of their associated transducers on the transformer tank 14. Thus, the center 60 of the first beam of cathode-ray oscilloscope 20, is positioned on the overlay 44 to correspond to the location of transducer 54, such as near the top center of sidewall portion 48, and the center 62 of the second beam of cathode-ray oscilloscope 20 is positioned on the right edge of overlay 44, substantially intermediate the top and bottom of the transformer 12, to correspond to the location of transducer 58. Other locations however, may be selected for transducers 54 and 58.

In like manner, the center 64 of the first beam of cathode-ray oscilloscope 22 is positioned on the overlay 46 to correspond to the location of transducer 56, such as near the top center of sidewall portion 50, and the center 66 of the second beam of cathode-ray oscilloscope 22 is positioned on the left edge of overlay 46, substantially intermediate the top and bottom portions of the transformer, to correspond to the location of transducer 58.

The signals applied to cathode-ray oscilloscopes 20 185 22 which generate the circles are initiated substantially simultaneously with the corona discharge by picking up the electrical disturbance caused by the corona discharge, such as at the bushing tap 68, as illustrated in FIG. 1, or by a current probe on the transformer neutral. The signal responsive to the initiation of the corona discharge triggers ramp generators 70, 72 and 74 which are connected to transducers 54, 56 and 58, respectively. In order to separate the portion of the output signal from a transducer which is responsive to corona induced mechanical vibrations, from that portion of the transducer output signal responsive to normal background noise in energized electrical apparatus, each electrical output signal is passed through a band or high pass filter network, and the output signal of the band-pass filter is amplified to that value required by the ramp generators. The signal from bushing tap 68 may be similarly processed. For example, the signal from transducer 54 is passed through a band-pass filter network 76, and amplified by amplifier 78. The signal from transducer 56 is passed through band-pass filter network 80, and amplified in amplifier 82. The from transducer 58 is passed through band pass filter network 84 and amplified in amplifier 86. The signal from the bushing tap 68 is passed through band-pass filter network 88, and amplified in amplifier 90. The output of amplifier 90 is connected to all three of the ramp generators 70, 72 and 74.

The ramp generators 70, 72, and 74 provide voltage signals which increase from zero at a rate selected to be responsive to the velocity of the corona initiated pressure waves in the transformer fluid, times a constant determined by the specific circuitry used and the size of the transformer overlay. The increase in each ramp voltage is terminated when the transducer associated with a ramp voltage generator detects the corona initiated pressure waves. Thus, the final magnitude of each ramp voltage is responsive to the distance from the corona source to the associated transducer.

The ramp voltage are applied to sine wave generators of the type which have an output voltage magnitude responsive to the magnitude of a direct-current input signal, with sine wave generators 92, 94 and 96 being connected to the output of ramp generators 70, 72 and 74, respectively. In order to produce Lissajous figures on the screens of the cathode-ray oscilloscopes having a configuration of a circle, the output of each sine wave generator is divided into first and second parallel paths, with the first path being connected directly to one terminal of its associated beam on the cathode-ray oscilloscope, and the other is connected to the remaining terminal through a 90° phase shifting network. Thus, the output of the terminals, such as terminal 24, associated with the first beam of cathode-ray oscilloscope 20, and the output of sine wave generator 92 is connected to terminal 26 via a 90° phase shift network or circuit 98. In like manner, the output of sine wave generator 94 is connected directly to terminal 32 of cathode-ray oscilloscope 22, and the output of sine wave generator 94 is connected to terminal 34 of cathode-ray oscilloscope 22, via 90° phase shifting network 100. The output of sine wave generator 96 is connected directly to terminals 28 and 36 of cathode-ray oscilloscopes 20 and 22, respectively, and to terminals 30 and 38 of cathode-ray oscilloscopes 20 and 22, respectively, through 90° phase shifting network 102.

In the operation of corona detecting and locating apparatus 10, shown in FIG. 1, an electrical pickup is disposed to detect a corona discharge substantially simultaneously with its occurrence, such as by detecting the discharge at bushing tap 68, and this signal is passed through band-pass filter 88, amplified in amplifier 90, and applied to ramp generators 70, 72 and 74. This signal initiates or triggers the operation of the ramp generators providing output voltages at the output terminals of the ramp generators having a linear voltage ramp of a predetermined slope. Thus, as shown in the graph in FIG. 2, ramp generators 70, 72 and 74 simultaneously initiate, at points 104, 106 and 108, respectively linearly increasing voltages having slopes of like magnitude. The slope of the ramp voltages corresponds to the pressure wave velocity of the corona initiated disturbance in the electrical apparatus, times a constant which is determined by the specific circuitry used and the size of the overlay.

The ramp generator continues to linearly increase their output voltages until the transducers associated with the ramp generators detect the mechanical vibrations initiated by the corona discharge. In the example shown in FIG. 2, transducer 58 is the closest to the corona source, terminating the increase in the ramp voltage provided by ramp generator 74 at point 110. Transducer 54 then detects the vibrations a short time later, terminating the increase in the ramp voltage provided by ramp generator 70 at point 112, and transducer 56 is the last to detect the vibrations, terminating the increase in the output voltage ramp provided by ramp generator 72 at point 114.

Figure 2:
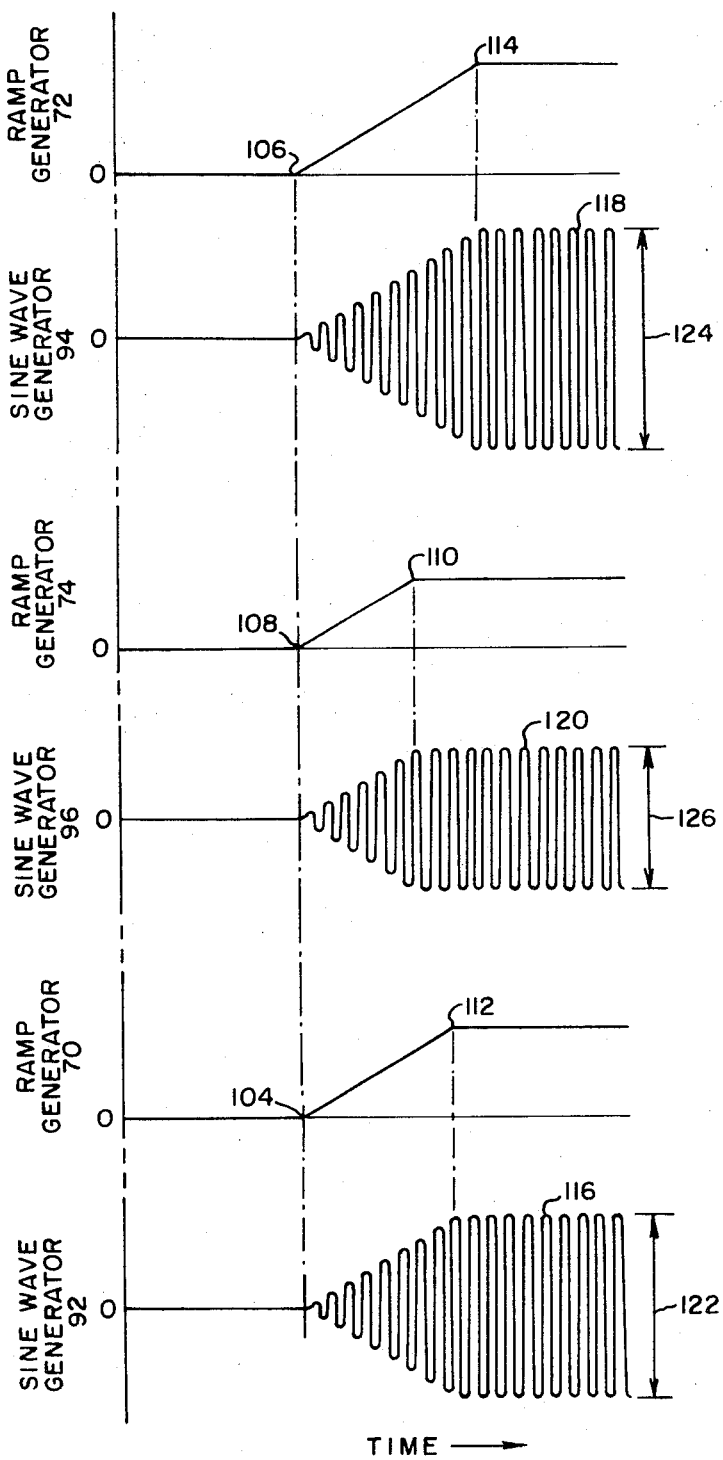
FIG. 2 is a graph which aids in understanding the embodiment of the invention shown in FIG. 1.

Sine wave generators 92, 94 and 96 are of the type which have an output voltage amplitude which follows the magnitude of a DC control voltage applied thereto. Therefore, applying the output voltages of ramp generators 70, 72 and 74 to the sine wave generators 92, 94 and 96, respectively, provides output voltage waveforms 116, 118, and 120, respectively, as shown in FIG. 2. The peak-to-peak amplitudes 122, 124 and 126 of the output voltage waveforms 116, 118 and 120, respectively, are proportional to the distance traveled by the pressure waves from the corona source to the transducers 54, 56 and 58, respectively. The circles produced on the screens of the cathode-ray oscilloscopes 20 and 22 thus have radii proportional to the distance between the transducers and the source of corona discharge. The final output voltage of sine wave generator 942 provides a circle 130 having a radius responsive to the magnitude 122 of the sine wave voltage, and the output voltage of sine wave generator 96 provides a circle 132 having a radius responsive to the magnitude 126 of the sine wave voltage. The centers 60 and 62 of circles 130 and 132 are located on overlay 44 corresponding to the location of transducers 54 and 58 on sidewall portion 48 of transformer 12. Thus, the source of corona, looking at this view of transformer 12, is within the common portion 134 of circles 130 and 132. If the common portion 134 is too large to be of benefit, the location of transducer 54, or transducer 58, or both may be changed and the test repeated.

The view of transformer 12 at right angles to the view represented by overlay 44, shown on the screen of cathode-ray oscilloscope 22, determines the distance of the corona from the sidewall portion 48, with the corona being within the common portion 140 of circles 136 and 138. Circle 136 is generated by the output voltage of sine wave generator 94, and circle 138 is generated by the output voltage of sine wave transformer 96.

The location of the corona source in transformer 12, using the methods and apparatus of the first embodiment of the invention, may be quickly ascertained by test personnel having little or no technical training. If the location is not pinpointed accurately enough by the first test set up, the transducers may be relocated and the test repeated to obtain the smallest common portion between intersecting circles on each cathode-ray oscilloscope.

If a more accurate determination of the corona source is required, the X, Y and Z Cartesian coordinates of the corona source may be directly provided by following the teachings of a second embodiment of the invention. In this embodiment, the source of corona discharge within the casing of electrical apparatus is located by a new and improved method which includes the steps of providing first, second, third and fourth transducers, and disposing them in vibration responsive association with the electrical inductive apparatus such that a line drawn from the fourth transducer to any of the other transducers, is perpendicular to lines drawn from the fourth transducer to each of the remaining transducers. Signals responsive to the distance of each transducer from the source of corona discharge are processed through electronic circuitry selected and arranged to provide three voltages each having a magnitude responsive to one of the coordinates of the corona source.

Figure 3:
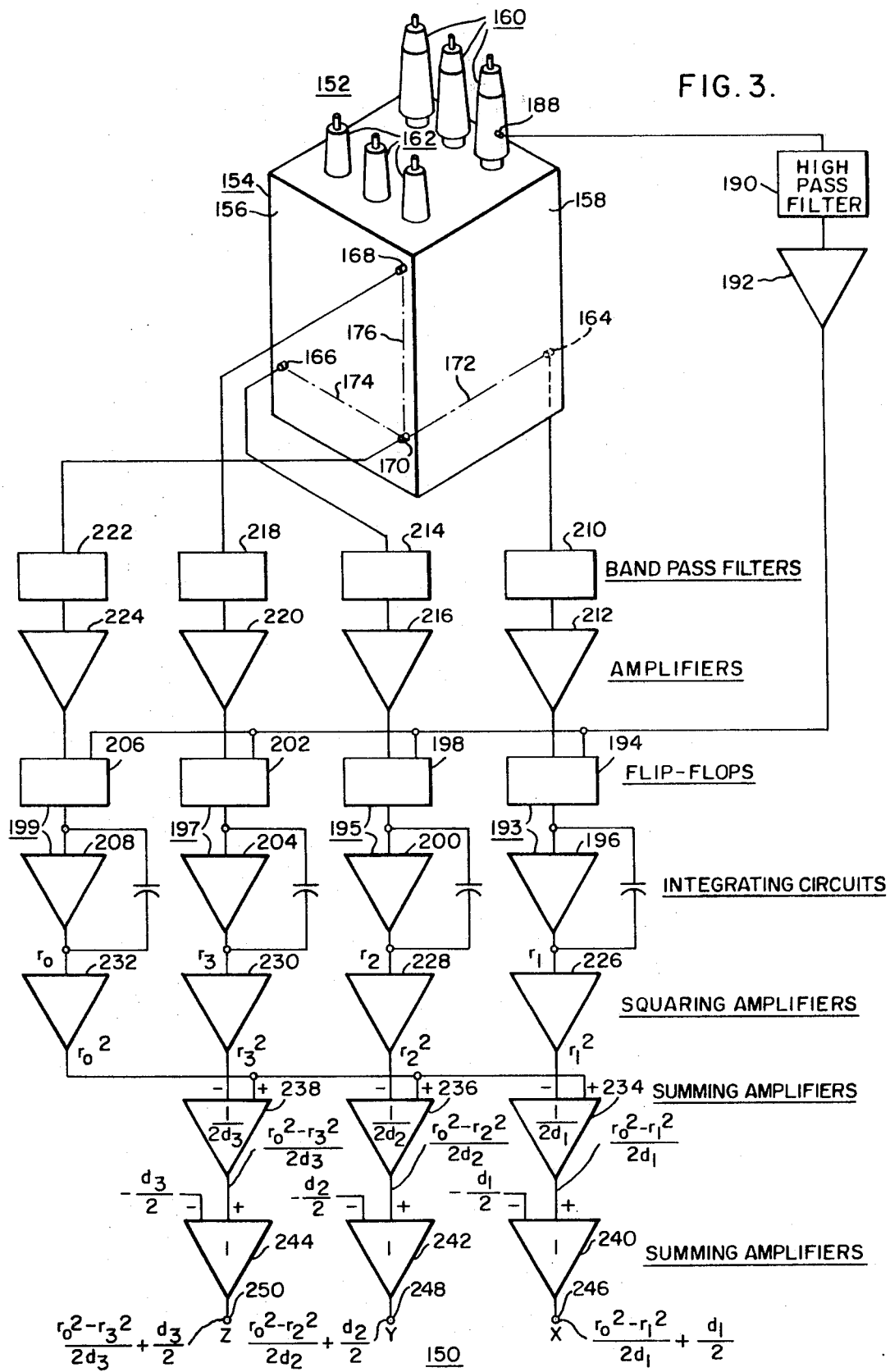
FIG. 3 is a block diagram of corona test apparatus constructed according to another embodiment of the invention.

Referring to FIG. 3, there is shown corona testing apparatus 150 for locating a source of corona in electrical inductive apparatus, such as transformer 152. Transformer 152 is similar to the transformer 12 shown in FIG. 1, having a tank or casing 154, a plurality of sidewall portions, such as portions 156 and 158, high and low voltage bushing assemblies 160 and 162, respectively, and electrical windings (not shown) disposed within the casing and immersed in a fluid insulating dielectric, such as transformer oil.

Corona test apparatus 150, in this embodiment, includes first, second, third and fourth mechanical to electrical transducers 164, 166, 168 and 170, respectively, disposed in vibration responsive association with transformer 152, such as in contact with the outside wall portions of the tank 154. The arrangement of transducers 164, 166, 168 and 170 is critical in this embodiment, as they must be placed to simulate a Cartesian coordinate system. For example, as shown in FIG. 3, the fourth transducer 170 may be taken as the zero or reference point of a Cartesian coordinate three dimensional graph. An imaginary line 172 drawn between the fourth transducer 170 and the first transducer 164 simulates the X axis, an imaginary line 174 drawn between the fourth transducer 170 and the second transducer 164 simulates the Y axis, and an imaginary line 176 drawn between the fourth transducer 170 and the third transducer 168 simulates the Z axis. The fourth transducer 170 may be disposed on sidewall portion 156 of tank 154, adjacent the corner which separates sidewall portions 156 and 158, and near the bottom of the tank. The first transducer 164 may be disposed on the opposite or parallel sidewall portion, such that line 172 is perpendicular to both of the sidewall portions. The second transducer 166 may be placed on sidewall portion 156, such that line 174 is perpendicular to line 172 and in the same horizontal plane. The third transducer 168 may be placed on sidewall portion 156, directly above transducer 170, and near the top of tank 154, such that line 176 is perpendicular to lines 172 and 174. Thus, any one of the imaginary lines is perpendicular to the other two. The transducers are spaced apart to insure that any corona source will fall within the cube formed by using the transducers for four of the corners of the cube.

Figure 4:
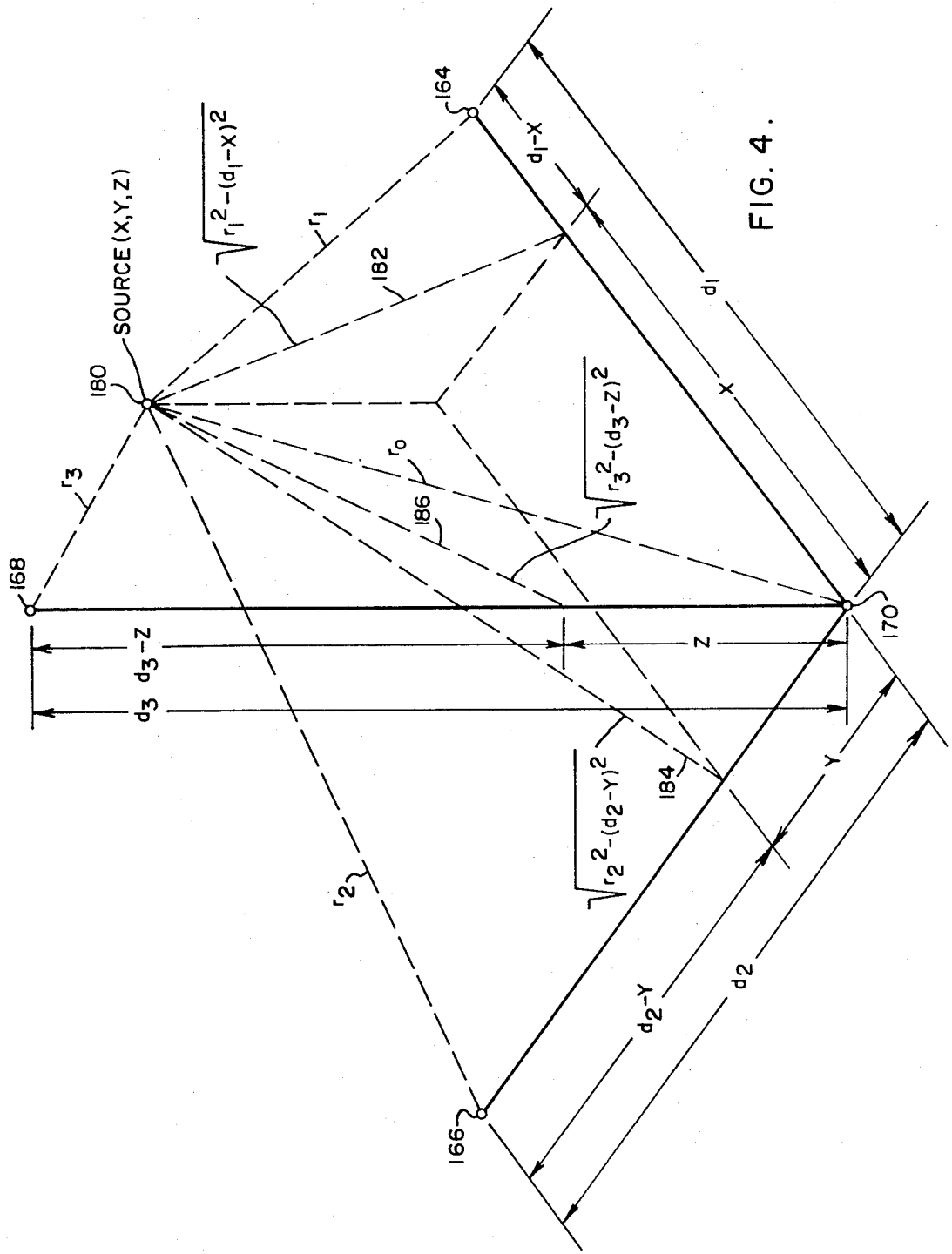
FIG. 4 is a diagram which aids in understanding the embodiment of the invention shown in FIG. 3.

The graph shown in FIG. 4, may be used to illustrate how the X, Y and Z coordinates of a source 180 of corona may be determined. The transducers 164, 166, 168 and 170 are disposed as illustrated in FIG. 3, with the measured distances from the fourth transducer 170 to the first, second and third transducers 164, 166 and 168 being referenced $d1$, $d2$, and $d3$, respectively. The distances from the source 180 of corona to the first, second, third and fourth transducers are referenced $r_1$, $r_2$, $r_3$, and $r_0$, respectively. Using the triangle formed by the sides $d_1$, $r_0$ and $r_1$, the X coordinate of source 180 may be found by drawing a line 182 from source 180 to the side $d_1$, such that the line 182 is perpendicular to side $d_1$. Thus, side $d_1$ is divided into two portions, a first portion X, and a second portion $d_1-X$. The length of line 182 may now be found, using the PYTHAGOREAN theorem, with the length of line 182 being equal to $\sqrt{r_1^2-(d_1-x)^2}$. The length of the X coordinate may now be found, again using the PYTHAGOREAN theorem, which provides $$X=\frac{r_0^2-r_1^2}{2d_1}+\frac{d_1}{2}$$

In like manner, starting with the triangle having sides $d_2$, $r_0$, and $r_2$, and drawing a line 184 from source 180 to side $d_2$, such that line 184 is perpendicular to side $d_2$, the length of line 184 is found to be equal to: $\sqrt{r_2^2-(d_2-y)^2}$, and the length of the coordinate is found to be:

$$Y=\frac{r_0^2-r_2^2}{2d_2}+\frac{d_2}{2}$$

The length of the Z coordinate is found by using the triangle having sides $d_3$, $r_0$, and $r_3$, and drawing a line 186 from the source 180 to side $d_3$, perpendicular to side $d_3$. The length of side 186 is found to be equal to: $\sqrt{r_3^2-(d_3-z)^2}$, and the length of the Z coordinate is found to be:

$$Z=\frac{r_0^2-r_3^2}{2d_3}+\frac{d_3}{2}$$

Since the dimensions $d_1$, $d_2$ and $d_3$ are known, it is necessary to determine the dimensions $r_0$, $r_1$, $r_2$, and $r_3$, the distances from the transducers to the source of corona. Corona testing apparatus 150 shown in FIG. 3 obtains signals having magnitudes responsive to the distances from the transducers to the source of corona, and performs the steps necessary to directly develop three signals responsive to the X, Y and Z coordinates of the corona source.

More specifically, as shown in FIG. 3, four signals are provided which are proportional to the distances from the corona source to the four transducers, by initiating the output of four ramp generators substantially instantaneously with the occurrence of a corona discharge. The occurrence of corona discharge may be detected at a bushing tap, such as at bushing tap 188, as shown, and this signal may be passed through a band pass filter 190 and amplified in amplifier 192, as hereinbefore explained relative to the first embodiment of the invention. The filtered and amplified signal is applied to the first, second, third and fourth triggered ramp generators 193, 195, 197 and 199, respectively, with each ramp generator in this embodiment, comprising a flip-flop circuit and an integrating circuit. For example, the first ramp generator 193 may include flip-flop circuit 194 and an integrating circuit 196, the second ramp generator 195 may include a flip-flop circuit 198 and an integrating circuit 200, the third ramp generator 197 may include a flip-flop circuit 202 and an integrating circuit 204, and the fourth ramp generator 199 may include a flip-flop circuit 206 and an integrating circuit 208.

The ramp generators cease to increase their output voltage when they receive a signal from a transducer, which signal indicates that the transducer has detected mechanical vibrations set up by the pressure waves initiated by the corona discharge. Transducer 164 is connected to the first ramp generator 193 through band pass filter network 210 and amplifier 212, transducer 166 is connected to the second ramp generator 195 through band pass filter network 214 and amplifier 216, transducer 168 is connected to the third ramp generator 197 through band pass filter network 218 and amplifier 220, and the fourth transducer 170 is connected to the fourth ramp generator 199 through band pass filter network 222 and amplifier 224.

The voltage appearing at the output terminals of ramp generators 193, 195, 197 and 199, respectively, are responsive to the distances $r_1$, $r_2$, $r_3$, and $r_0$, respectively which are illustrated in FIG. 4. Each of these voltage signals $r_1$, $r_2$, $r_3$ and $r_0$ are then passed through squaring amplifiers 226, 228, 230 and 232, respectively, providing output voltages which have a magnitude equal to the square of the input voltage. Thus, the output voltage of squaring amplifiers 226, 228, 230 and 232 are responsive to the signals $r_1^2$, $r_2^2$, $r_3^2$ and $r_0^2$, respectively. Next, the voltage $r_0^2$ is compared with each of the voltages $r_1^2$, $r_2^2$ and $r_3^2$ in summing amplifiers 234, 236 and 238, respectively, which amplifiers are adjusted to provide gains equal to $1/2d_1$, $1/2d_2$, and $1/2d_3$, respectively. Summing amplifiers 234, 236 and 238 substract the signals $r_1^2$, $r_2^2$ and $r_3^2$ from $r_0^2$, respectively, providing output voltages responsive to $$\frac{r_0^2 - r_1^2}{2d_1}, \frac{r_0^2 - r_2^2}{2d_2} \text{ and } \frac{r_0^2 - r_3^2}{2d_3},$$

respectively.

The voltage signals from summing amplifiers 234, 236 and 238 are applied to summing amplifiers 240, 242 and 244, respectively, which amplifiers have a gain of one, and which have applied to their summing input terminals signals having the magnitudes of $-d_1/2$, $-d_2/2$ and $-d_3/2$, respectively. Thus, the output voltages of summing amplifiers 240, 242, and 244, which appear at terminals 246, 248 and 250, respectively, are equal to $$\frac{r_0^2 - r_1^2}{2d_1} + \frac{d_1}{2}, \frac{r_0^2 - r_2^2}{2d_2} + \frac{d_2}{2} \text{ and } \frac{r_0^2 - r_3^2}{2d_3} + \frac{d_3}{2},$$

which signals are responsive to the X, Y and Z coordinates respectively, of the source of corona discharge. By properly calibrating the circuitry, the voltage magnitude appearing at terminals 246, 248, and 250 may give the X, Y and Z coordinates directly in any desired units of measurement, and the voltages may be displayed on such monitoring equipment as meters, X-Y recorders, or oscilloscopes.

In summary, there has been disclosed a first method for detecting and locating corona which includes the steps of providing cathode-ray oscilloscope means having a plurality of beams, positioning a plurality of mechanical to electrical transducers in vibration responsive association with the electrical apparatus, electrically connecting the plurality of transducers to control predetermined beams of the oscilloscope means, positioning the centers of the beams to correspond to the locations of their associated transducers, relative to the electrical apparatus, initiating circles with the plurality of beams of the oscilloscope means, substantially simultaneously with the occurrence of a corona discharge in the electrical apparatus, increasing the radii of the circles at a rate proportional to the pressure wave velocity of the corona induced vibrations in the fluid of the apparatus, terminating the increasing radii of each circle when its associated transducer detects the corona impulse, and holding the maximum values of the radii of the circles, at least until a photograph may be taken of the screen, or the information otherwise noted from the screen. The common area between two intersecting circles indicates the location of corona when observing the transformer from a direction perpendicular to a plane passed through the transducers used for the specific tests. A similar test, taken with transducers disposed on a plane perpendicular to the transducers of a first plane, will pinpoint the location of the corona within the apparatus being tested. This method enables test personnel to quickly and accurately determine the location of a corona source within the casing of electrical apparatus, and they may do so without any special technical training. New and improved apparatus for performing the method is also disclosed.

Another embodiment of the invention discloses a new and improved method for locating corona in which the Cartesian coordinates of the corona source are directly generated by the steps of providing first, second, third and fourth transducers, disposing the transducers in vibration responsive association with the electrical apparatus, and arranged relative to one another such that a line drawn from the fourth transducer to any of the transducers is perpendicular to the lines drawn from the fourth transducer to the remaining transducers, generating signals having magnitudes responsive to the distances from the transducers to the source of the corona discharge, and then processing these signals, along with signals responsive to the spacing between the transducers, to generate three voltages having magnitudes responsive to the X, Y and Z coordinates of the corona source. This method may be used when a more accurate determination of the corona source is required than that obtainable by the first embodiment. New and improved apparatus for performing the method of the second embodiment is also disclosed.

I claim as my invention:

1. A method of detecting and locating the source of corona discharges in electrical apparatus having a casing containing electrical windings disposed in a fluid, comprising the steps of:
   providing cathode-ray oscilloscope means having a plurality of beams,
   positioning a plurality of mechanical to electrical transducers in vibration responsive association with the electrical apparatus,
   electrically connecting the plurality of transducers to control predetermined beams of the oscilloscope means,
   positioning the centers of each of the plurality of beams to correspond to the location of its associated transducers relative to the electrical apparatus,
   initiating a plurality of circles with the plurality of beams of the oscilloscope means, substantially simultaneously with the occurrence of a corona discharge in the electrical apparatus,
   increasing the radii of the plurality of circles at a rate proportional to the pressure wave velocity of the corona impulse in the field of the electrical apparatus,
   and terminating the increasing radii of the circles when their associated transducers detect the corona impulse.

2. The method of claim 1 including the step of providing overlays for the oscilloscope means corresponding to the electrical apparatus, with the centers of each of the beams being positioned on the overlays to correspond to the position of its associated transducer relative to the electrical apparatus.

3. The method of claim 1 wherein first and second cathode-ray oscilloscopes are provided, each having first and second beams, and first, second nd third transducers are provided, with the third transducer controlling a beam of each of the first and second cathode-ray oscilloscopes, and the first and second transducers controlling the remaining beams of the first and second cathode-ray oscilloscopes, respectively.

4. Apparatus for detecting and locating the source of a corona discharge in electrical apparatus having a casing containing electrical windings disposed in a fluid, comprising:

cathode-ray oscilloscope means having at least first and second beams, and first and second deflection terminals for controlling each of the beams, first and second ramp voltage means for providing first and second triggered ramp voltages, respectively, means providing signal substantially simultaneously with the occurrence of a corona discharge in the electrical apparatus, connected to said first and second ramp voltage means, with said signal triggering the first and second ramp voltages, respectively, at least first and second mechanical to electrical transducers adapted to be disposed in vibration responsive association with the electrical apparatus, connected to said first and second ramp voltage means, respectively, said first and second transducers terminating the increase of said first and second ramp voltages, respectively when each detects the corona discharge, first and second oscillator means connected to said first and second ramp voltage means, respectively, providing first and second alternating-current sine wave output voltages having an amplitude which increases in response to the increasing magnitudes of the first and second ramp voltages, respectively, first and second phase shift means, means connecting the first alternating-current output voltage to the first terminal of the first beam, and through said first phase shift means to the second terminal of the first beam, and means connecting the second alternating-current output voltage to the first terminal of the second beam, and through said second phase shift means to the second terminal of the second beam, said first and second alternating current voltages providing first and second circles on said cathode-ray oscilloscope means, whose radii are responsive to the distances from the source of corona to said first and second transducers, respectively.

5. The apparatus as claim 4 including an overlay having an outline configuration of the electrical apparatus, said overlay being disposed on the cathode-ray oscilloscope means with the centers of the first and second circles being disposed on the overlay corresponding to the positions of their associated transducers relative to the electrical apparatus.

6. The apparatus of claim 4 wherein the cathode-ray oscilloscope means include first and second cathode-ray oscilloscopes each having first and second beams, and first and second deflection terminals associated with each beam, and including a third mechanical to electrical transducer adapted to be disposed in vibration responsive association with the electrical apparatus, third ramp voltage means providing a third ramp voltage, third oscillator means providing a third alternating current output voltage, and third phase shift means, the first and second alternating-current output voltages being connected to terminals associated with beams of said first and second cathode-ray oscilloscopes, respectively, said third ramp voltage means being connected to the means which provides the signal substantially simultaneously with the occurrence of the corona discharge, to the third transducer, and to the third oscillator means, providing a third alternating-current output voltage responsive to the third ramp voltage, means connecting said third alternating-current output voltage to the first terminal of the remaining beams of each of said first and second cathode-ray oscilloscopes, and through said remaining beams of each of said first and second cathode-ray oscilloscopes.

7. The apparatus of claim 4 including first and second overlays for said first and second cathode ray oscilloscopes, respectively, having the configuration of first and second adjacent sidewall portions of the electrical apparatus, respectively, with each cathode-ray oscilloscope having first and second circles, the centers of which are disposed on the first and second overlays to correspond to the positions of the first and third, and third and second transducers, respectively, relative to the electrical apparatus.

8. A method of locating the source of corona discharge in electrical apparatus having a casing containing electrical windings disposed in a fluid, comprising the steps of:

providing first, second, third and fourth mechanical to electrical transducers, disposing the first, second, third and fourth transducers in vibration responsive association with the electrical apparatus, arranging the first, second, third and fourth transducers relative to one another such that a line drawn from the fourth transducer to any other transducer is perpendicular to lines drawn from the fourth transducer to each of the remaining transducers, with the distances from the fourth to the first, second and third transducers being $d_1$, $d_2$ and $d_3$, respectively, providing signals $r_1$, $r_2$, $r_3$ and $r_0$ having magnitudes responsive to the distances from the first, second, third and fourth transducers to the source of the corona discharge, respectively, squaring the magnitudes of signals $r_1$, $r_2$, $r_3$ and $r_0$ to provide signals $r_1^2$, $r_2^2$, $r_3^2$ and $r_0^2$, subtracting each of the signals $r_1^2$, $r_2^2$ and $r_3^2$ from signal $r_0^2$ to provide signals $r_0^2-r_1^2$, $r_0^2-r_2^2$, and $r_0^2-r_3^2$, amplifying the signals $r_0^2-r_1^2$, $r_0^2-r_2^2$ and $r_0^2-r_3^2$ with a gain of $1/2d_1$, $1/2d_2$ and $1/2d_3$ respectively, to provide signals $$\frac{r_0^2-r_1^2}{2d_1}, \frac{r_0^2-r_2^2}{2d_2}$$

and $$\frac{r_0^2-r_3^2}{2d_3},$$

and adding signals having the magnitudes of $d_1/2$, $d_2/2$ and $d_3/2$ to the signals $$\frac{r_0^2-r_1^2}{2d_1}, \frac{r_0^2-r_2^2}{2d_2} \text{ and } \frac{r_0^2-r_3^2}{2d_3},$$

respectively, to provide first second and third signals equal to $$\frac{r_0^2-r_1^2}{2d_1}+\frac{d_1}{2}, \frac{r_0^2-r_2^2}{2d_2}+\frac{d_2}{2} \text{ and } \frac{r_0^2-r_3^2}{2d_3}+\frac{d_3}{2},$$

respectively, which signals are responsive to the Cartesian coordinates of the source of the corona discharge.

9. The method of claim 8 wherein the step of providing signals $r_1$, $r_2$, $r_3$ and $r_0$ includes the steps of initiating first, second, third and fourth ramp voltages substantially simultaneously with the occurrence of the corona discharge, terminating the increase in the first, second, third and fourth ramp voltages when the first, second, third and fourth transducers detect the corona discharge, respectively, and measuring the maximum magnitude of the first, second, third and fourth ramp voltages.

10. Apparatus for locating the source of a corona discharge, comprising:

electrical apparatus having a casing containing electrical windings disposed in a fluid, first, second, third and fourth mechanical to electrical transducers disposed in vibration responsive association with said electrical apparatus, with the distances from the fourth to the first, second, and third transducers being $d_1$, $d_2$ and $d_3$, respectively, and with the transducers being arranged such that a line drawn from the fourth transducer to any of the other transducers is perpendicular to lines drawn from the fourth transducer to each of the remaining transducers, corona detecting means providing a signal substantially simultaneously with the occurrence of a corona discharge in the electrical apparatus, first, second, third and fourth triggered means connected to said first, second, third and fourth transducers, respectively, and to said corona detecting means, providing signals $r_1$, $r_2$, $r_3$ and $r_0$, respectively, having magnitudes responsive to the distances from the first, second, third and fourth transducers to the source of corona discharge, first, second, third and fourth squaring amplifiers connected to said first, second, third and fourth triggered signal means, respectively, providing signals $r_1^2$, $r_2^2$, $r_3^2$ and $r_0^2$, respectively, first, second, and third summing amplifiers having gains of $d_1/2$, $d_2/2$, and $d_3/2$ respectively, connected to said first, second and third squaring amplifiers, respectively, and to said fourth squaring amplifier, providing signals $$\frac{r_0^2-r_1^2}{2d_1}, \frac{r_0^2-r_2^2}{2d_2} \text{ and } \frac{r_0^2-r_3^2}{2d_3},$$

respectively, first, second and third signal means providing signals having amplitudes proportional to $d_1/2$, $d_2/2$, and $d_3/2$, respectively, fourth, fifth and sixth summing amplifiers connected to said first, second and third signals means, respectively, and to said first, second and third summing amplifiers, respectively, providing first, second and third signals having a magnitude proportional to $$\frac{r_0^2-r_1^2}{2d_1}+\frac{d_1}{2}, \frac{r_0^2-r_2^2}{2d_2}+\frac{d_2}{2} \text{ and } \frac{r_0^2-r_3^2}{2d_3}+\frac{d_3}{2},$$

which signals are the Cartesian coordinates of the source of the corona discharge.

11. The apparatus of claim 10 wherein the fourth, fifth and sixth amplifiers each have a gain of one.

12. The apparatus of claim 10 wherein the first, second, third and fourth signal means each include a flip-flop circuit and an integrating circuit, with the signals $r_1$, $r_2$, $r_3$ and $r_0$ being initiated by the corona detecting means when it detects a corona discharge, and with the maximum magnitude being responsive to the time delay before its associated transducer detects the corona discharge.

* * * * *